(12) United States Patent
Loukas (10) Patent No.: US 7,152,164 B1
(45) Date of Patent: Dec. 19, 2006

(54) NETWORK ANTI-VIRUS SYSTEM

(76) Inventor: Pasi Into Loukas, Kemintie 969, Rovaniemi (FI) 96700

( * ) Notice: Subject to any disclaimer, the term of this patent is extended or adjusted under 35 U.S.C. 154(b) by 773 days.

(21) Appl. No.: 09/993,218

(22) Filed: Nov. 26, 2001

Related U.S. Application Data

(60) Provisional application No. 60/251,220, filed on Dec. 6, 2000.

(51) Int. Cl.
*G06F 11/30* (2006.01)
*G06F 12/14* (2006.01)
*H04L 9/32* (2006.01)
*G06F 12/16* (2006.01)
*G06F 15/18* (2006.01)

(52) U.S. Cl. .................. 713/188; 713/186; 726/24; 709/213; 709/225; 709/229; 709/232; 709/202

(58) Field of Classification Search ............... 713/188, 713/200, 201, 202, 186; 709/213, 245, 229, 709/202, 225, 232; 726/24
See application file for complete search history.

(56) References Cited

U.S. PATENT DOCUMENTS

| | | | | |
|---|---|---|---|---|
| 5,623,600 A | * | 4/1997 | Ji et al. | 713/201 |
| 5,832,208 A | * | 11/1998 | Chen et al. | 713/201 |
| 6,088,803 A | * | 7/2000 | Tso et al. | 713/201 |
| 6,094,731 A | * | 7/2000 | Waldin et al. | 714/38 |
| 6,338,141 B1 | * | 1/2002 | Wells | 713/200 |
| 6,701,440 B1 | * | 3/2004 | Kim et al. | 726/24 |
| 6,721,721 B1 | * | 4/2004 | Bates et al. | 707/1 |
| 6,757,830 B1 | * | 6/2004 | Tarbotton et al. | 713/188 |
| 6,763,466 B1 | * | 7/2004 | Glover | 713/200 |
| 6,785,732 B1 | * | 8/2004 | Bates et al. | 709/232 |
| 6,976,271 B1 | * | 12/2005 | Le Pennec et al. | 726/24 |
| 2001/0020272 A1 | * | 9/2001 | Le Pennec et al. | 713/200 |
| 2003/0191957 A1 | * | 10/2003 | Hypponen et al. | 713/200 |

* cited by examiner

*Primary Examiner*—Ayaz Sheikh
*Assistant Examiner*—Shin-Hon Chen (57) ABSTRACT

A network based anti-virus system especially for wide area networks, like the Internet. In the system when a client computer downloads files or other web content from the network, their identifications are sent to an anti-virus host computer which compares them to a database of the identifications of known virus infected files or other known virus infected web content. Security measures are taken if a sent identification has a close enough match in the database. The system includes optionally an intermediate computer, like a LAN server, an ISP's server, network node computer or the source host computer of the downloaded files or other web content; which delivers the identifications to the anti-virus host computer on the behalf of the client computer. Security measures include the client computer or the intermediate computer preventing the download of the detected dangerous files or other web content to the client computer, or the client computer deleting the same from the client computer if they have already been downloaded; the client computer, the intermediate computer or the anti-virus host computer scanning the same for viruses when needed; and the client computer scanning itself for viruses when needed.

23 Claims, 5 Drawing Sheets

NETWORK ANTI-VIRUS SYSTEM

Claims the benefit of provisional application No. 60/251,220 filed Dec. 6, 2000.

RELATED APPLICATIONS

U.S. Pat. No. 5,623,600, April, 1997, Ji et al.
U.S. Pat. No. 5,832,208, November, 1998, Chen et al.
U.S. Pat. No. 5,960,170, September, 1999, Chen et al.
U.S. Pat. No. 6,088,803, July, 2000, Tso et al
U.S. Pat. No. 6,094,731, July, 2000, Waldin et al.

BACKGROUND OF THE INVENTION

The existing anti-virus systems are relatively slow to respond to the emergence of new viruses. This is due to the professional character of the virus attacks, the growing sophistication of the virus code and the fast development of new viruses. The systems are vulnerable because it takes time to detect the new virus code in the infected files, to study how it works and to develop new virus removal modules for the virus scanners. It also takes time to deliver simultaneously large numbers of copies of the virus scanner update patches to the clients, what also consumes the bandwidth of the network nodes. The fact that this has to be done constantly over and over again makes the things worse. In addition in the client side there may be unwillingness or carelessness to allow the virus scanner to check for new virus updates as frequently as it should be done, or to have all the downloaded files to be scanned by the virus scanner for old—let alone new viruses. It is not either uncommon to neglect obtaining a virus scanner. And even if a virus scanner is in use, its user may be perplexed by the complex and confusing scanning options. In addition it takes time to publicize the new virus discoveries in the organizations because of public relations reasons. The existing systems also waste processing power of network servers and home computers, because they require that each downloaded file is scanned for viruses. This is exacerbated by the rapid pace which the virus signature databases are growing in size.

The present invention was developed in order to overcome these problems with an efficient and well-organized Internet based anti-virus system which is capable to quickly response to the threats posed by new viruses. The introduced anti-virus system frees the network servers and home computers from redundant virus scanning by centralizing the virus combating functions. The centralization guarantees that the information about new viruses is immediately benefiting all the clients belonging to the system, and because of the architecture of the system a mere detection of an infected file is enough to impose an instant internet-wide download blockage for it without having to wait for the development and distribution of the virus removal modules for virus scanners. At the core of the system, the detection of the infected files is based mainly on the comparison of tiny-sized file identifications, wherefor no bandwidth or processing power is wasted. The system also lowers the barrier for the organizations to disclose the suspected new virus infections, because it has not necessarily to be done publicly but can simply be done to a central anti-virus host computer anonymously.

DESCRIPTION OF THE PRIOR ART

Prior art covers anti-virus systems where the downloaded files or e-mail are scanned in a client computer, LAN server, ISP's server or any host computer. In the systems meant for the reduction of unsolicited e-mail, the e-mail messages have been filtered on the basis of the properties of e-mail messages. This has normally been done either by a client computer, LAN server, ISP's mail server or any host computer which acts as a mail server or provides web-based e-mail accounts. The systems meant for limiting internet browsing include an internet browser software in a client computer preventing access to unsafe web sites, and an ISP's server preventing access of client computers to web sites which have adult content.

SUMMARY OF THE INVENTION

A network based anti-virus system especially for wide area networks, like the Internet. In the system when a client computer downloads files or other web content from the network, their identifications are sent to an anti-virus host computer which compares them to a database of the identifications of known virus infected files or other known virus infected web content. Security measures are taken if a sent identification has a close enough match in the database. The system includes optionally an intermediate computer, like a LAN server, an ISP's server, network node computer or the source host computer of the downloaded files or other web content; which delivers the identifications to the anti-virus host computer on the behalf of the client computer. Security measures include the client computer or the intermediate computer preventing the download of the detected dangerous files or other web content to the client computer, or the client computer deleting the same from the client computer if they have already been downloaded; the client computer, the intermediate computer or the anti-virus host computer scanning the same for viruses when needed; and the client computer scanning itself for viruses when needed.

The system can be used directly by the home users and individual users in businesses and other organizations, or the businesses and organizations can use it to protect their workstations by signing up their servers for the system. The internet operators can sign up their relay servers and mail servers for the system to protect their clients. The web site operators can protect their visitors by including the system support in their download links or download features in the web pages. In individual use the system interface can be integrated to an internet browser software or to an independent download manager software.

In the system the file and other web content identifications can be sent in compressed form over the network to further reduce their tiny size. When privacy is needed, the identifications can be sent in encrypted form over the network.

In addition of preventing the download of virus infected files and other web content, the system can also be used to prevent downloading of non-wanted/unacceptable files and other web content.

DESCRIPTION OF THE DRAWINGS

FIG. 13: Example. Left side in figure: A client computer wants to download a file (F) from a host computer (HC). An intermediate computer (IC) between the client computer and the HC has requested the inspection of the F from the Anti-Virus Host Computer (AVHC). After inspecting the F on the basis of the file identification information and/or data identification information of the F, the AVHC has determined that the F is potentially infected by a virus. Therefor the AVHC wants to have a virus scan for the F, and receives the F from the IC, or alternatively retrieves the F straight from the HC using the URL-address of the F provided by the IC or acquired by the AVHC from the file identification information of the F. Right side in figure: The AVHC gives feedback (FB) to the IC about the results of the virus scan of the F.

DETAILED DESCRIPTION

A network based anti-virus system especially for wide area networks, like the internet, where one or more anti-virus host computers (AVHC) handle requests of client computers to inspect if said client computers are in danger to be infected with computer viruses. Said AVHCs are any computers in the network chosen for that purpose. When client computers download files from ordinary host computers, they inquire from an AVHC either before or after said downloading, if any of said files may contain viruses. Said ordinary host computers are here any computers in the network retaining or relaying files.

Figure 1:
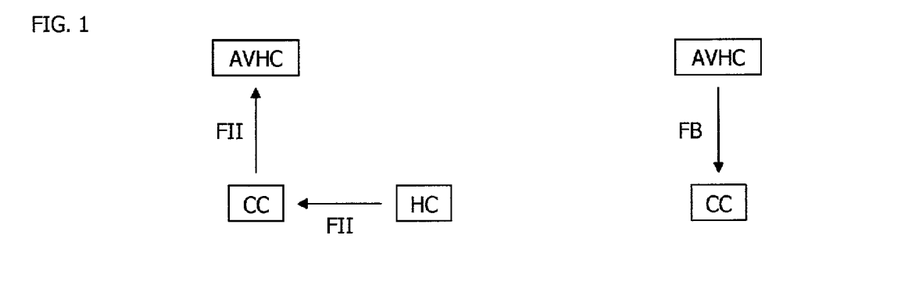
FIG. 1: Example. Left side in figure: A client computer (CC) is going to download a file from a host computer (HC). The CC gets file identification information (FII) for said file from the HC and sends the FII to the Anti-Virus Host Computer (AVHC) which uses the FII to perform an inspection for said file. Right side in figure: The AVHC sends feedback (FB) to the CC about the results of said inspection.

A client computer downloading a file gathers optionally file identification information (FII) about said file, and sends said FII to the AVHC (see FIG. 1). Said FII comprises one or more of the following properties of said file: source URL-address, source computer URL-address, name, type, content type, size, creation date, version number, publisher, authentication certificate, or other properties of said file.

Figure 2:
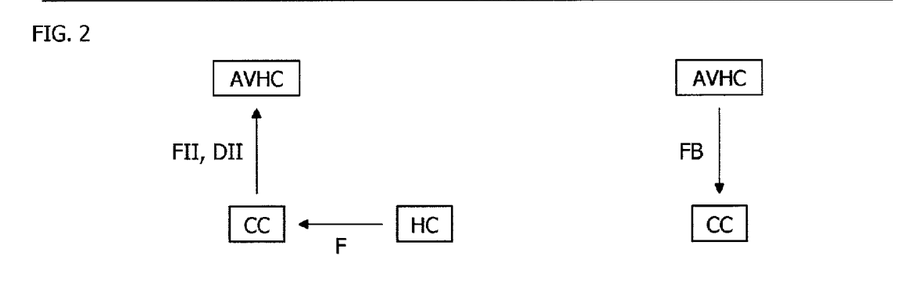
FIG. 2: Example. Left side in figure: A client computer (CC) is going to download a file (F) from a host computer (HC). The CC downloads the F and gathers both file identification information (FII) and data identification information (DII) for the F, and sends the FII and DII to the Anti-Virus Host Computer (AVHC) which uses the FII and DII to perform an inspection for the F. Right side in figure: The AVHC sends feedback (FB) to the CC about the results of said inspection.

When said inquiring happens after said downloading, a client computer which has downloaded a file, optionally gathers data identification information (DII) about said file in addition to or without gathering the FII for said file, and sends said DII to the AVHC (see FIG. 2). Said DII is generated by A) calculating a check-sum or any identification value for a downloaded file based upon the data of said file, and/or B) by sampling data according to a certain pattern, algorithm or other rule from a downloaded file, or C) by copying all data of a downloaded file.

Figure 3:
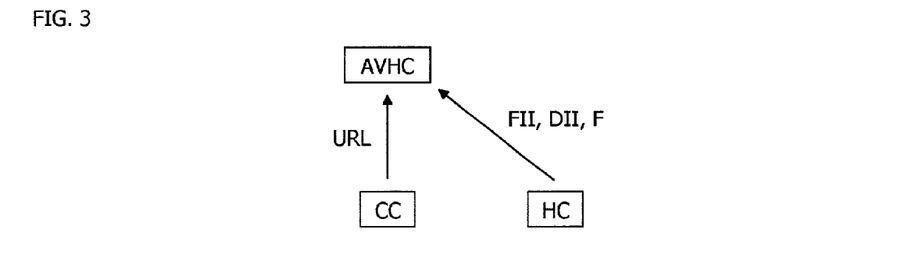
FIG. 3: Example. A client computer (CC) sends to the Anti-Virus Host Computer (AVHC) a URL-address (URL) of a file (F) that the CC wants to download from a host computer (HC). The AVHC uses said URL-address to retrieve file identification information (FII) and data identification information (DII) for the F from the HC. In order for the AVHC to retrieve DII for the F from the HC, the AVHC needs to retrieve the F itself (or a part of the F, if DII is gathered only from the beginning of the F) from the HC. In order for the AVHC to retrieve DII for the F from the HC, the HC alternatively cooperates with the AVHC and gathers the DII on behalf of the AVHC and sends the DII to the AVHC.

The FII and/or DII for a file is alternatively acquired by the AVHC self independently and directly from the source computer of said file using the URL-address of said file provided by the client computer which requested the inspection of said file (see FIG. 3). Said source computer optionally cooperates with the AVHC, gathering the DII for said file on behalf of the AVHC and sending it to the AVHC so that the AVHC does not necessarily have to download said file or a part of said file to gather the DII for said file.

When the AVHC has received or acquired the FII and/or DII for an inspected file, it checks if the properties of said FII and/or DII match or resemble in certain part(s) the properties of FII and/or DII detected earlier in instances of virus infected files, malicious web sites or host computers, malicious publishers, or other harmful or potentially harmful situations. If said compared properties in said certain part(s) match or resemble each other to a certain extent, the AVHC determines that said inspected file is a security threat, being harmful or potentially harmful, and sends information to respective client computer which requested said inspection, to inform said client computer that said file is a security threat, and to warn the user of said client computer about said security threat (see FIGS. 1 and 2, right sides). The AVHC optionally informs said client computer if the AVHC has determined that said inspected file is not a security threat.

In said checking, if the AVHC has only the FII of a file to be used in said checking and if the result of said checking was not sure enough, then the AVHC optionally requests the DII for said file from the client computer which requested the inspection of said file, so that the AVHC is able to perform more thorough checking. In said checking, if the AVHC has only the DII of a file to be used in said checking and if the result of said checking was not sure enough, then the AVHC optionally requests the FII for said file from the client computer which requested the inspection of said file, so that the AVHC is able to perform more thorough checking.

Figure 4:
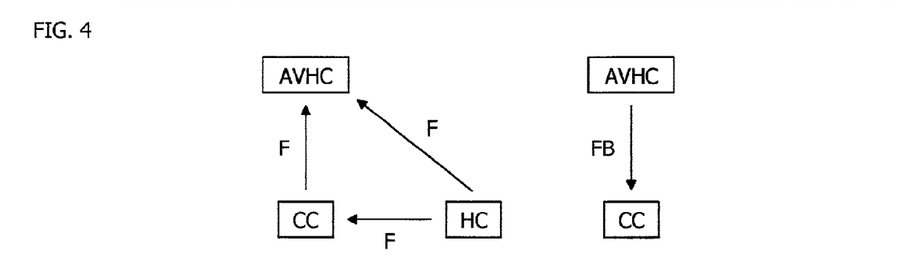
FIG. 4: Example. Left side in figure: A client computer (CC) wants to download a file (F) from a host computer (HC). The CC has requested the inspection of the F from the Anti-Virus Host Computer (AVHC). After inspecting the F on the basis of the file identification information and/or data identification information of the F, the AVHC has determined that the F is potentially infected by a virus. Therefor the AVHC wants to have a virus scan for the F, and receives the F from the CC, or alternatively retrieves the F straight from the HC using the URL-address of the F provided by the CC or acquired by the AVHC from the file identification information of the F. Right side in figure: The AVHC gives feedback (FB) to the CC about the results of the virus scan of the F.

In case of a said security threat file, said client computer downloads said file if it has not downloaded said file yet and sends it to the AVHC, or alternatively said file is downloaded directly by the AVHC self independently and directly from the source computer of said file using the URL-address of said file picked from the FII of said file, or using the URL-address of said file delivered separately to the AVHC by said client computer (see FIG. 4). Alternatively, if said client computer has earlier sent said security threat file to the AVHC as the DII of said file, then that copy of said file is used by the AVHC. The AVHC scans said security threat file for viruses, or delegates said scanning to other host computer.

In alternative to said AVHC performed or AVHC delegated virus scanning, said client computer itself optionally downloads newest anti-virus software or update patch(es) for said anti-virus software from the AVHC or other host computer, uses said anti-virus software to scan said security threat file for viruses, and if said anti-virus software finds virus(es) in said file, said client computer informs the AVHC about said virus infection and sends said file to the AVHC.

Said security threat file is not scanned for viruses if said file's FII and/or DII resemble enough the FII and/or DII of an earlier detected infected file. The AVHC deems said resemblance to be a verification of an infection in said security threat file.

In case of a virus scan or said FII and/or DII resemblance verified virus infection of said security threat file, the AVHC stores the FII and/or DII of said infected file, or adds said infection case to a statistics record for said FII and/or DII if the AVHC has earlier stored identical said FII and/or DII. The AVHC stores optionally also said infected file itself. The database of said stored FII and DII along with said related infection statistics and said stored infected files are used by the AVHC in said anti-virus system for recognition and profiling of harmful or potentially harmful: files, web sites or host computers, publishers and situations having security risk.

In case of a virus scan verified virus infection of said security threat file, the AVHC optionally stores also information about and/or source code of the virus which caused said virus infection, and/or delivers said virus information and/or source code to certain other host computers keeping databases of viruses.

In case of a virus scan verified virus infection of said security threat file, the AVHC informs about said infection the client computer which requested said inspection (see FIG. 4, right side), and said client computer destroys said infected file in said client computer if said client computer has already downloaded said infected file, or said client computer prevents the download of said infected file to said client computer if said client computer has not yet downloaded said infected file.

Figure 5:
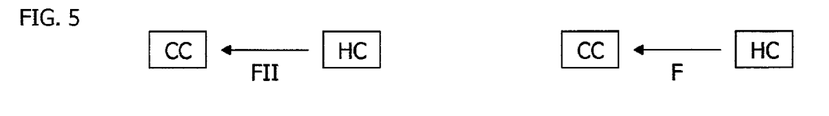
FIG. 5: Example. Left side in figure: A client computer (CC) wants to download a file (F) from a host computer (HC) and gets file identification information (FII) of the F from the HC. Right side in figure: The CC downloads the F without requesting inspection for the F from the Anti-Virus Host Computer, if the URL-address of the source web site or host computer of the F, or the authenticated publisher of the F, is found in a list of trustworthy web sites, host computers, and file publishers provided by the Anti-Virus Host Computer to the CC.

The client computers optionally make lists of the frequently and/or recently visited web sites or host computers, and authenticated publishers of frequently and/or recently downloaded files, that the AVHC has determined to be trustworthy or relatively trustworthy, and if the source web site or host computer, or the authenticated publisher of a file that a client computer wants to download is found in a said list, then said client computer downloads said file without having inspection for said file's FII or DII, or for said file itself by the AVHC (see FIG. 5).

Figure 6:
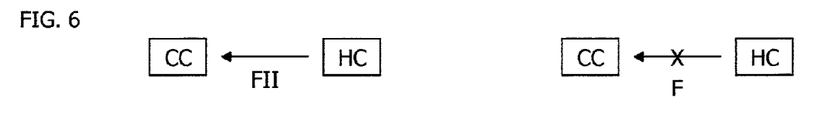
FIG. 6: Example. Left side in figure: A client computer (CC) wants to download a file (F) from a host computer (HC) and gets file identification information (FII) of the F from the HC. Right side in figure: The CC prevents the download of the F to the CC without requesting inspection for the F from the Anti-Virus Host Computer, if the F itself, or the URL-address of the source web site or host computer of the F, or the authenticated publisher of the F, is found in a list of harmful and potentially harmful files, file publishers, web sites and host computers provided by the Anti-Virus Host Computer to the CC.

The AVHC optionally provides temporary lists for the client computers about harmful and potentially harmful: files, publishers, and web sites or host computers. When a client computer wants to download a file, and said file, said file's publisher, or said file's source web site or host computer is found in a said temporary list, then said client computer notifies the user of said client computer about that and prevents the download of said file to said client computer without having said file inspected by the AVHC (see FIG. 6). This is useful when dangerous virus(es) are spreading wide and fast in the network, to prevent the AVHC from blocking because of numerous requests of client computers to inspect downloaded files, and to effectively obstruct the spreading of the viruses.

Figure 7:
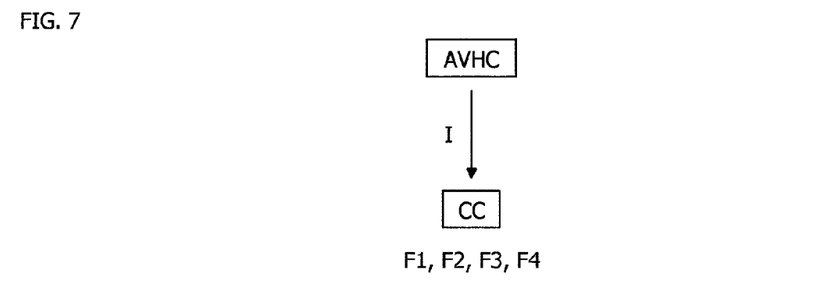
FIG. 7: Example. The Anti-Virus Host Computer (AVHC) informs (I) the client computer (CC) user about new infection cases where the properties of file identification information and/or data identification information of infected files match or resemble in certain part(s) the properties of file identification information and/or data identification information of the certain files (F1, F2, F3 and F4) downloaded earlier by the CC user.

The AVHC optionally informs the user of a client computer about new infection cases where the properties of FII and/or DII of infected files match or resemble in certain part(s) the properties of FII and/or DII of one or more files that said user has downloaded earlier within certain time window, or the properties of FII and/or DII of one or more files belonging to certain number of latest said user downloaded files (see FIG. 7).

Figure 8:
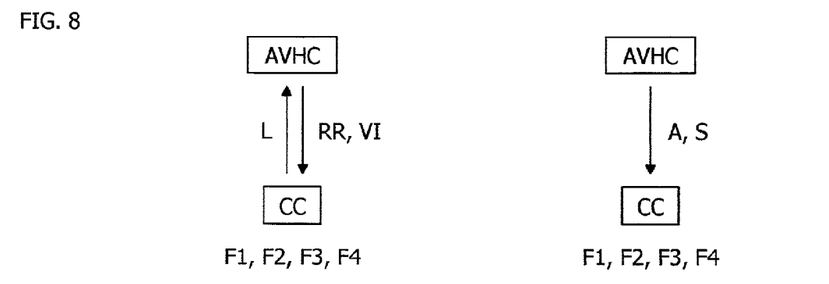
FIG. 8: Example. Left side in figure: A client computer (CC) user is able to login (L) to the Anti-Virus Host Computer (AVHC) and view risk ratings (RR) and any afterwards detected virus infections (VI) for the files (F1, F2, F3 and F4) which he or other user using the CC has earlier downloaded. Right side in figure: When carrying out a virus scan with an updated anti-virus software for an inspected file, the AVHC has detected an infection in said file. Said file is found also among the CC user earlier downloaded files (F1, F2, F3 and F4). The AVHC alerts (A) the CC user that on his computer is an infected file, and provides a software (S) to the CC which removes from the CC the virus causing said infection, and destroys also said infected file.

The AVHC optionally keeps register of download statistics for the users of client computers, said register containing FII and/or DII, and risk ratings for the files that a user of client computer has downloaded. Said risk ratings are determined by the AVHC as a measure of harmfulness or potential harmfulness of said downloaded files. Said register contains optionally also information about newly detected infection cases for the earlier downloaded and inspected files, in which the AVHC could not earlier have detected a virus infection. The user of client computer is able to login to the AVHC and view said risk ratings and any said afterwards detected infections for the files which he or other user using the same client computer has earlier downloaded (see FIG. 8, left side). The AVHC contacts and alerts the users of client computers who self have downloaded or who are using a client computer on which another person has downloaded any said files which were afterwards detected to be infected, and provides a software for said users, said software acting in a client computer to remove said afterwards detected virus(es) and optionally to remove said infected files itself (see FIG. 8, right side).

Figure 9:
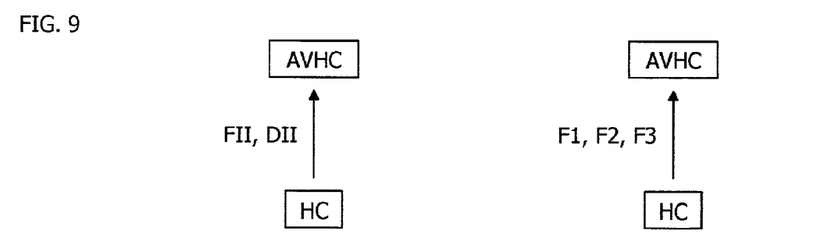
FIG. 9: Example. Left side in figure: The Anti-Virus Host Computer (AVHC) seeks infected files in a host computer (HC) independently using file identification information (FII) and/or data identification information (DII) of the known infected files in recognition of said infected files. Right side in figure: The AVHC seeks infected files in the HC independently by downloading some files (F1, F2 and F3) from the HC and scanning said files for viruses, or delegating said scanning to other host computer.

The AVHC optionally seeks infected files in host computers independently using FII and/or DII of the known infected files in recognition of said infected files (see FIG. 9, left side). The AVHC optionally seeks infected files in host computers independently by downloading some files from said host computers and scanning said files for viruses, or delegating said scanning to other host computer (see FIG. 9, right side). In said two seeking methods, if a file is found to be infected with a virus, the AVHC stores the FII and/or DII for said infected file or adds said infection case to a statistics record for said FII and/or DII if the AVHC has earlier stored identical said FII and/or DII, and optionally stores said infected file itself.

Figure 10:
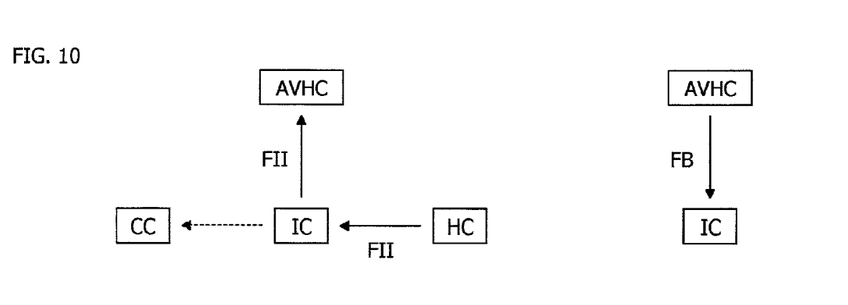
FIG. 10: Example. Left side in figure: A client computer (CC) wants to download a file from a host computer (HC). Between the CC and HC is an intermediate computer (IC) which retrieves the file identification information (FII) for said file from the HC and sends the FII to the Anti-Virus Host Computer (AVHC) which uses the FII to perform an inspection for said file. Right side in figure: The AVHC sends feedback (FB) to the IC about the results of said inspection.
Figure 11:
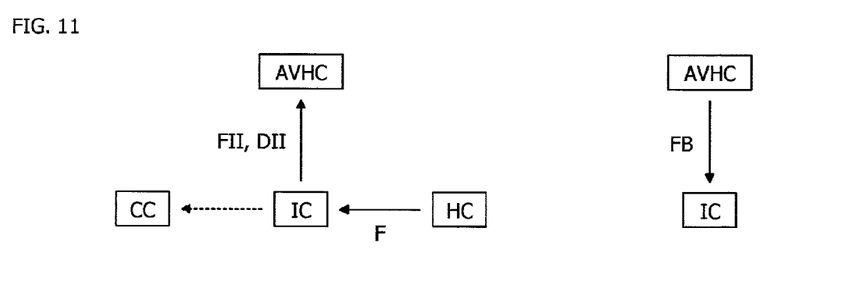
FIG. 11: Example. Left side in figure: A client computer (CC) wants to download a file (F) from a host computer (HC). Between the CC and HC is an intermediate computer (IC) which downloads the F from the HC and gathers both file identification information (FII) and data identification information (DII) for the F, and sends the FII and DII to the Anti-Virus Host Computer (AVHC) which uses the FII and DII to perform an inspection for the F. Right side in figure: The AVHC sends feedback (FB) to the IC about the results of said inspection.
Figure 12:
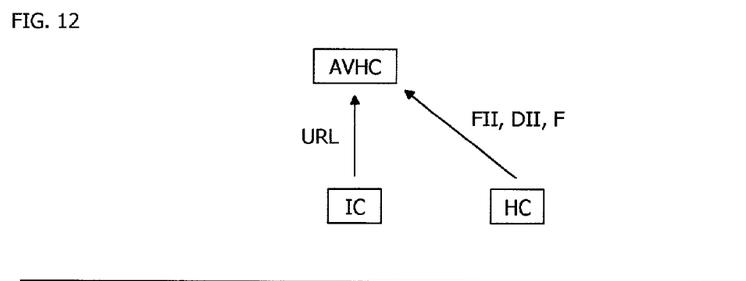
FIG. 12: Example. An intermediate computer (IC) between a client computer and a host computer (HC) sends to the Anti-Virus Host Computer (AVHC) a URL-address (URL) of a file (F) that the client computer wants to download from the HC. The AVHC uses said URL-address to retrieve file identification information (FII) and data identification information (DII) for the F from the HC. In order for the AVHC to retrieve DII for the F from the HC, the AVHC needs to retrieve the F itself (or a part of the F, if DII is gathered only from the beginning of the F) from the HC. In order for the AVHC to retrieve DII for the F from the HC, the HC alternatively cooperates with the AVHC and gathers the DII on behalf of the AVHC and sends the DII to the AVHC.

The FII and/or DII for a file about to be downloaded by a client computer is optionally provided to the AVHC by an intermediate computer like the local area network host computer of said client computer, the internet service provider computer of said client computer, the source computer of said file, or other computer, like a node computer, in the downloading chain from the source computer of said file to the downloading client computer (see FIGS. 10 and 11). The FII and/or DII for said file is alternatively acquired by the AVHC independently and directly from the source computer of said file using the URL-address of said file provided by said intermediate computer (see FIG. 12). Said source computer optionally cooperates with the AVHC, gathering the DII for said file on behalf of the AVHC and sending it to the AVHC so that the AVHC does not necessarily have to download said file or a part of said file to gather the DII for said file.

Said intermediate computer receives feedback from the AVHC about the security risk relating to said file about to be downloaded by said client computer (see FIGS. 10 and 11, right sides), and if said security risk exceeds a certain level, said intermediate computer prevents the download of said file, delivers optionally a message to said client computer about said prevention and optionally sends said withheld file to the AVHC. If said withheld file is not delivered to the AVHC by said intermediate computer, then the AVHC downloads said withheld file independently and directly from the source computer of said file using the URL-address of said file picked from the FII of said file, or using the URL-address of said file delivered separately to the AVHC by said intermediate computer (see FIG. 13). Alternatively, if said intermediate computer has earlier sent said withheld file to the AVHC as the DII of said file, then that copy of said file is used by the AVHC.

Said security risk is determined by the AVHC by checking if the properties of the FII and/or DII of said inspected file match or resemble in certain part(s) the properties of FII and/or DII detected earlier in instances of virus infected files, malicious web sites or host computers, malicious publishers, or other harmful or potentially harmful situations. What more said compared properties in said certain part(s) match or resemble each other, the greater security risk rating the AVHC gives to said inspected file. In said checking, if the AVHC has only the FII of a file to be used in said checking and if the result of said checking was not sure enough, then the AVHC optionally requests the DII for said file from said intermediate computer, so that the AVHC is able to perform more thorough checking. In said checking, if the AVHC has only the DII of a file to be used in said checking and if the result of said checking was not sure enough, then the AVHC optionally requests the FII for said file from said intermediate computer, so that the AVHC is able to perform more thorough checking.

Figure 13:
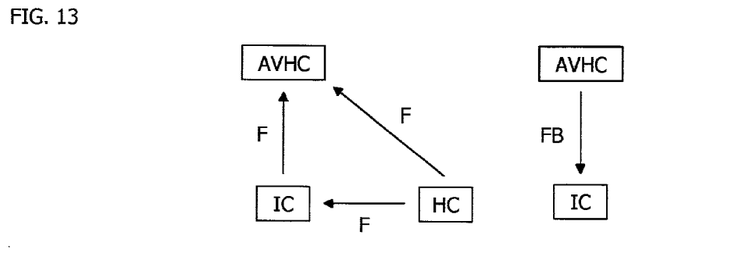

The AVHC performs virus scan for said withheld file which has said security risk exceeding certain level, or delegates said virus scan to other host computer, and provides information about the results of said virus scan to said intermediate computer (see FIG. 13, right side). In alternative to said AVHC performed or AVHC delegated virus scanning, said intermediate computer itself optionally downloads newest anti-virus software or update patch(es) for said anti-virus software from the AVHC or other host computer, uses said anti-virus software to scan said withheld file for viruses, and if said anti-virus software finds virus(es) in said file, said intermediate computer informs the AVHC about said virus infection and sends said file to the AVHC.

Said withheld file is not scanned for viruses if said file's FII and/or DII resemble enough the FII and/or DII of an earlier detected infected file. The AVHC deems said resemblance to be a verification of an infection in said withheld file.

In case of a virus scan or said FII and/or DII resemblance verified virus infection of said withheld file, the AVHC stores the FII and/or DII of said infected file, or adds said infection case to a statistics record for said FII and/or DII if the AVHC has earlier stored identical said FII and/or DII. The AVHC stores optionally also said infected file itself. The database of said stored FII and DII along with said related infection statistics and said stored infected files are used by the AVHC in said anti-virus system for recognition and profiling of harmful or potentially harmful: files, web sites or host computers, publishers and situations having security risk. The AVHC optionally stores also information about and/or source code of the virus which caused said virus infection, and/or delivers said virus information and/or source code to certain other host computers keeping databases of viruses.

Figure 14:
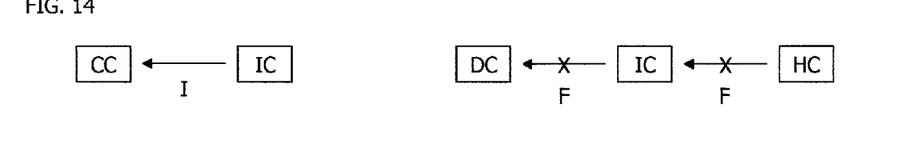
FIG. 14: Example. Left side in figure: An intermediate computer (IC) between a client computer (CC) and a host computer informs (I) the CC about the infection in a file (F) which the CC wants to download. Right side in figure: The IC prevents the download of the F through the IC by the CC, other client computers and other computers (DC) that are not specifically authorized to download it.
Figure 15:
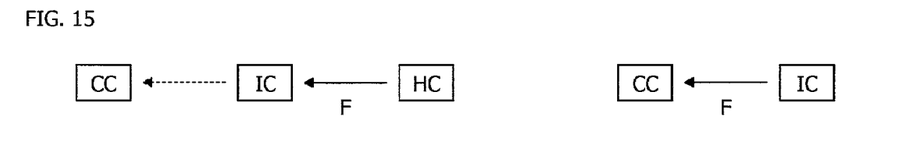
FIG. 15: Example. Left side in figure: A client computer (CC) wants to download a file (F) from a host computer (HC). An intermediate computer (IC) between the CC and HC has requested an inspection for the F from the Anti-Virus Host Computer. Right side in figure: In said inspection no infection was found in the F, wherefor the IC allows the download of the F continue normally to the CC.

In case of a virus infection of said withheld file, said intermediate computer optionally informs about said infection the client computer wanting to download said infected file, and optionally prevents permanently the download of said infected file through said intermediate computer by said downloading client computer, other client computers, downstream node computers and any other computers that are not specifically authorized to download it (see FIG. 14). If said withheld file is not found to be infected with a virus, said intermediate computer allows the download of said withheld file to continue normally (see FIG. 15).

Said intermediate computers deliver optionally together or in cooperation with the client computers to the AVHC all the needed FII and/or DII information for the downloaded files and also optionally said downloaded files itself when needed by the AVHC.

Figure 16:
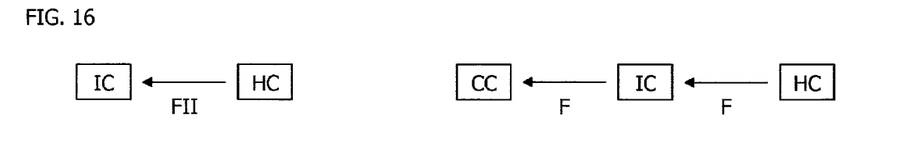
FIG. 16: Example. Left side in figure: A client computer (CC) wants to download a file (F) from a host computer (HC). An intermediate computer (IC) between the CC and HC gets file identification information (FII) of the F from the HC. Right side in figure: The IC allows the CC to download the F without requesting inspection for the F from the Anti-Virus Host Computer, if the URL-address of the source web site or host computer of the F, or the authenticated publisher of the F, is found in a list of trustworthy web sites, host computers, and file publishers provided by the Anti-Virus Host Computer to the IC.

Said intermediate computers optionally make lists of the frequently and/or recently visited web sites or host computers, and authenticated publishers of frequently and/or recently downloaded files, that the AVHC has determined to be trustworthy or relatively trustworthy, and if the source web site or host computer, or the authenticated publisher of a file that a client computer wants to download is found in a said list, then said client computer is allowed to download said file normally without said intermediate computer having inspection for said file's FII or DII, or for said file itself by the AVHC (see FIG. 16).

Figure 17:
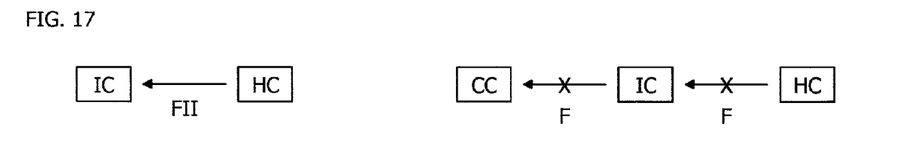
FIG. 17: Example. Left side in figure: A client computer (CC) wants to download a file (F) from a host computer (HC). An intermediate computer (IC) between the CC and HC gets file identification information (FII) of the F from the HC. Right side in figure: The IC prevents the CC to download the F without requesting inspection for the F from the Anti-Virus Host Computer, if the F itself, or the URL-address of the source web site or host computer of the F, or the authenticated publisher of the F, is found in a list of harmful and potentially harmful files, file publishers, web sites and host computers provided by the Anti-Virus Host Computer to the IC.

The AVHC optionally provides temporary lists for said intermediate computers about harmful and potentially harmful: files, publishers, and web sites or host computers. When a client computer wants to download a file, and said file, said file's publisher, or said file's source web site or host computer is found in a said temporary list, then a said intermediate computer optionally notifies the user of said client computer about that, and prevents the download of said file without having said file inspected by the AVHC (see FIG. 17). This is useful when dangerous virus(es) are spreading wide and fast in the network, to prevent the AVHC from blocking because of numerous requests of intermediate computers to inspect downloaded files, and to effectively obstruct the spreading of the viruses.

In said anti-virus system with or without said participating intermediate computers, the AVHC optionally provides case specific statistical information to the client computers, to the users of client computers and to said intermediate computers about the earlier AVHC inspected files. Said case specific statistical information tells how many virus infection and/or virus-free download cases it has been detected for those of said earlier inspected files which have had FII and/or DII matching or resembling in one or more properties the FII and/or DII of a file which is currently in said inspection. The AVHC optionally provides security risk ratings to the client computers, to the users of client computers and to said intermediate computers, a said risk rating calculated on the basis of said statistical information for a file which is currently in said inspection. The client computer optionally destroys the downloaded file or prevents the download of the file to said client computer, for which the AVHC has given a certain level of said risk rating. Said intermediate computer optionally prevents the download through said intermediate computer of the file, for which the AVHC has given a certain level of said risk rating. The AVHC optionally samples files among the inspected files which are not scanned for viruses but which have said risk ratings exceeding a certain level, and scans said sampled files for viruses. Said sampling happens optionally more frequently for the files which have greater said risk ratings.

In said anti-virus system with or without said participating intermediate computers, when there are multiple AVHCs, said AVHCs optionally deliver to each other information about the FII and DII of infected and potentially harmful files, and optionally said infected and potentially harmful files itself, and optionally information about viruses.

Figure 18:
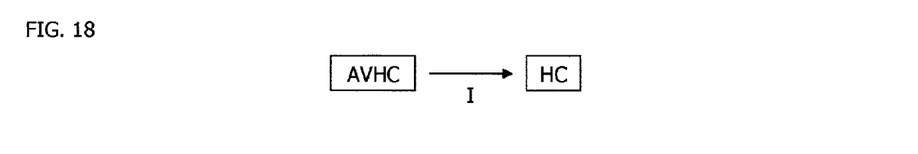
FIG. 18: Example. The Anti-Virus Host Computer (AVHC) detects an infected file and informs (I) about said infection the operator of the host computer (HC) which contains or relays said infected file.

In said anti-virus system with or without said participating intermediate computers, when the AVHC detects an infected file, the AVHC optionally informs about said infection the operator of the host computer which contains or relays said infected file (see FIG. 18).

In said anti-virus system with or without said participating intermediate computers, the mentioned files are alternatively e-mail messages, e-mail message attachments, web pages containing program scripts or other client computer processed components, independent program scripts or other client computer processed components, or any data downloaded by a client computer from any host computer.

In said anti-virus system with or without said participating intermediate computers, the mentioned URL-addresses are alternatively other type of data retrieval addresses, or sets of data retrieval instructions/steps.

Figure 19:
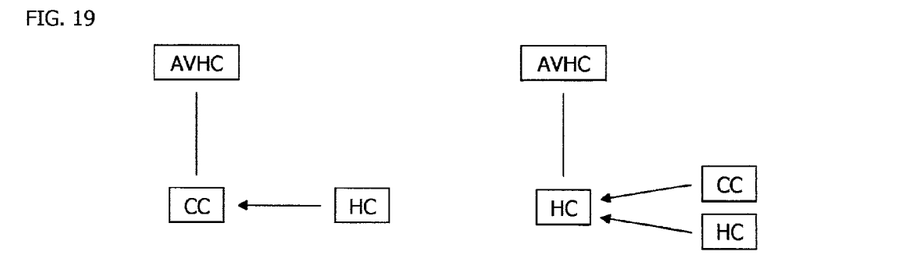
FIG. 19: Example. Left side in figure: Normal anti-virus system having a client computer (CC) which downloads files from a host computer (HC) and requests inspection for said files from the Anti-Virus Host Computer (AVHC). Right side in figure: File transfer system, where the normal anti-virus system is modified so that certain host computers (HC to which the two arrows point) to which files are transferred correspond to the client computers in the normal anti-virus system, and client computers (CC) and host computers (HC from which an arrow leaves) from which said files are transferred correspond to the host computers in the normal anti-virus system.
Figure 20:
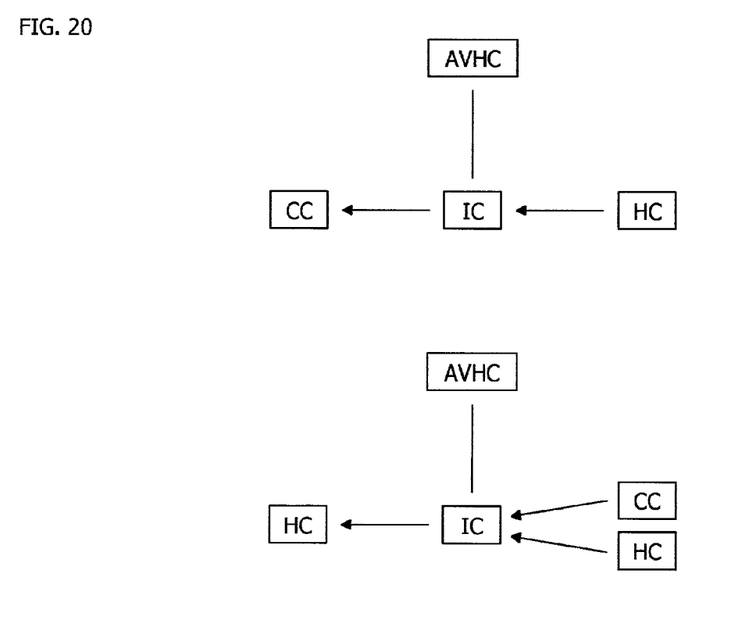
FIG. 20: Example. Above in figure: Normal anti-virus system having a client computer (CC) which downloads files from a host computer (HC), and an intermediate computer (IC) which requests inspection for said files from the Anti-Virus Host Computer (AVHC). Below in figure: File transfer system, where the normal anti-virus system having the IC is modified so that certain host computers (HC to which an arrow points) to which files are transferred correspond to the client computers in the normal anti-virus system, and client computers (CC) and host computers (HC from which an arrow leaves) from which said files are transferred correspond to the host computers in the normal anti-virus system.
Figure 21:
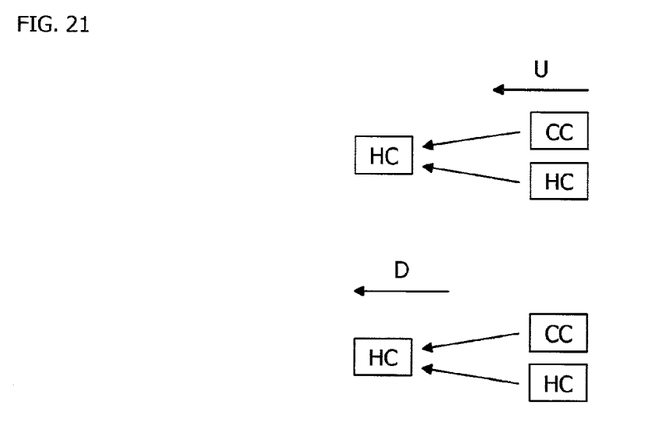
FIG. 21: Example. In said file transfer system, said file transfer happens either through uploading (U) method, where said file transfer is initiated by said client computers (CC) and host computers (HC from which an arrow leaves) from which the files are transferred (above in figure), or through downloading (D) method, where said file transfer is initiated by said certain host computers (HC to which the two arrows point) to which the files are transferred (below in figure).

Said anti-virus system with or without said participating intermediate computers is used optionally for a file transfer system where files are transferred from client computers or host computers to certain host computers. Said client computers and host computers from which files are transferred in said file transfer system correspond to the host computers in said anti-virus system, and said certain host computers to which said files are transferred to in said file transfer system correspond to the client computers in said anti-virus system (see FIGS. 19 and 20). In said file transfer system, said file transfer happens either through uploading method, where said file transfer is initiated by said client computers and host computers from which the files are transferred, or through downloading method, where said file transfer is initiated by said certain host computers to which the files are transferred (see FIG. 21). Said uploading and downloading transfers in said file transfer system correspond to the client computer performed downloading in said anti-virus system.

Said anti-virus system with or without said participating intermediate computers is optionally used for preventing the download of adult material. Said adult material download prevention system corresponds to said anti-virus system with the following modifications: The viruses mentioned in said anti-virus system correspond to adult material, the files mentioned in said anti-virus system correspond to web pages, files, e-mail messages, e-mail message attachments or other data; the virus infection mentioned in said anti-virus system corresponds to presence of adult material in a file or other data, and the virus scanning mentioned in said anti-virus system corresponds to adult material seeking/scanning. Said adult material download prevention system is used with or without said anti-virus system.

What is claimed is:

1. A network based web content identification and control system for wide area networks, like the Internet, comprising:
   client computer(s), which are any computers in the network;
   an examiner host computer, which is a remote third-party host computer in the wide area network, being outside of the local network sphere of:
      (a) the client computers,
      (b) any intermediate computer intercepting client requested web content,
      (c) and, any source host computer of the client requested web content;
   wherein the examiner host is an independently operating host as a master server, rather than a subordinate slave server such as a database server;
   wherein the examiner host controls its processes and resources independently, rather than under direct external command;
   performing an on-demand remote identity check on a specially established tiny-sized independent identification of the web content, what is used as a preferred method of processing rather than processing said web content as such;
   wherein said identification is a data object which is based on certain property(ies) of said web content so that a unique representation of the identity of said web content is established in smaller size;
   wherein said identity check relies on said identification in preference over obtaining said web content itself to said identity check;
   wherein said identity check is performed by the examiner host in response to a remote service request;
   wherein said identification is delivered without said web content for said identity check, in response to a client direct request to receive said web content from the network;
   wherein in response to said identity check service request, the examiner host reserves to the service requestor a temporary service-specific:
      (a) service access,
      (b) service communication bridge,
      (c) and, service process;
   wherein the examiner host returns the results of said identity check as a feedback, and on the basis of said results:
      (a) it is performed safety or preventive measures,
      (b) and/or, it is informed said client,
      (c) or, no specific actions are performed;
   wherein the web content comprises file(s), web page(s), e-mail message(s), e-mail message attachment(s) or any data which a client can acquire from the network.

2. A network based web content identification and control system according to claim 1, comprising:
   wherein said identity check comprises the examiner host comparing the delivered identification to stored identifications of web content.

3. A network based web content identification and control system according to claim 2, comprising:
   wherein said delivered identification consists of file identification information and/or data identification information;
   wherein a said stored identification consists of file identification information and/or data identification information;

wherein said file identification information comprises one or more of the following properties of the web content:
(a) source URL-address or other type of address,
(b) source computer URL-address or other type of address,
(c) name,
(d) type,
(e) content type,
(f) size,
(g) creation date,
(h) version number,
(i) publisher,
(j) authentication certificate,
(k) or, other properties;
wherein said data identification information comprises:
(a) a check-sum or any identification value based upon the data of the web content,
(b) and/or, a data sample picked according to a certain pattern, algorithm or other rule from the web content.

4. A network based web content identification and control system according to claim 2, comprising:
wherein said stored identifications belong to known virus infected web content.

5. A network based web content identification and control system according to claim 4, comprising:
wherein said safety measures include one or more of the following:
(a) preventing the download of the examined web content to the client computer,
(b) performing a virus scan on the examined web content in the client computer or in the examiner host computer,
(c) destroying the examined web content.

6. A network based web content identification and control system according to claim 5, comprising:
wherein the examiner host calculates an estimate for the security threat level of the examined web content and informs it to the client.

7. A network based web content identification and control system according to claim 4, comprising:
intermediate computer(s), which are any computers in the network capable to intercept data which client computers receive from the network;
wherein said delivered identification is delivered to the examiner host computer by a said intermediate computer.

8. A network based web content identification and control system according to claim 7, comprising:
wherein said safety measures include one or more of the following:
(a) the intermediate computer preventing the download of the examined web content to the client computer,
(b) the intermediate computer performing a virus scan on the examined web content,
(c) the intermediate computer destroying the examined web content.

9. A network based web content identification and control system according to claim 7, comprising:
wherein a said intermediate computer is:
(a) a server of the local area network,
(b) a server of the internet service provider,
(c) or, a network node computer.

10. A network based web content identification and control system according to claim 2, comprising:
wherein said stored identifications belong to known non-wanted web content.

11. A network based web content identification and control system according to claim 10, comprising:
wherein said preventive measures include preventing the download of the examined web content to the client computer, and/or destroying the examined web content.

12. A network based web content identification and control system according to claim 10, comprising:
intermediate computer(s), which are any computers in the network capable to intercept data which client computers receive from the network;
wherein said delivered identification is delivered to the examiner host computer by a said intermediate computer.

13. A network based web content identification and control system according to claim 12, comprising:
wherein said preventive measures include the intermediate computer preventing the download of the examined web content to the client computer, and/or the intermediate computer destroying the examined web content.

14. A network based web content identification and control system according to claim 12, comprising:
wherein a said intermediate computer is:
(a) a server of the local area network,
(b) a server of the internet service provider,
(c) or, a network node computer.

15. A network based web content identification and control system according to claim 2, comprising:
wherein said safety or preventive measures are performed when said comparison yields a confirmed match.

16. A network based web content identification and control system according to claim 15, comprising:
wherein if said comparison does not yield a definite match, then a close enough resemblance of the delivered identification to any of the stored identification(s) is deemed to be a confirmed match.

17. A network based web content identification and control system according to claim 1, comprising:
wherein said client computers are host computers into which data is uploaded.

18. A network based web content identification and control system for wide area networks, like the Internet, comprising:
client computer(s), which are any computers in the network;
an examiner host computer, which is a remote third-party host computer in the wide area network, being outside of the local network sphere of:
(a) the client computers,
(b) any intermediate computer intercepting client requested web content,
(c) and, any source host computer of the client requested web content;
wherein the examiner host is an independently operating host as a master server, rather than a subordinate slave server such as a database server;
wherein the examiner host controls its processes and resources independently, rather than under direct external command;
a client creating an ad-hoc independent identification for a web content by selectively extracting data item(s) from said web content or by generating data signature(s) on the basis of selected data of said web content;
the client delivering said identification without said web content to the examiner host which performs in response to the client service request an on-demand analysis for said identification;

wherein said analysis relies on said identification in preference over obtaining said web content itself to said analysis;

wherein in response to said client made service request, the examiner host reserves to the client a temporary service-specific:
(a) service access,
(b) service communication bridge,
(c) and, service process;

on the basis of said analysis, the examiner host determining whether the web content to which said identification belongs is:
(a) a security threat or not,
(b) or, non-wanted or not;

the examiner host returning feedback to the client on the basis of said analysis;

wherein the web content comprises file(s), web page(s), e-mail message(s), e-mail message attachment(s) or any data which a client can acquire from the network.

19. A network based web access control method for wide area networks, like the Internet, comprising:

a client preparing to access a web-address to receive web content from the network;

the client creating an ad-hoc independent identification which contains at least:
(a) said web-address,
(b) or, a part of said web-address which identifies the pertinent host;

the client delivering said identification to an examiner host which performs in response to the client service request an on-demand identity check for said identification;

wherein the examiner host is a remote third-party host computer in the wide area network, being outside of the local network sphere of:
(a) the client computer,
(b) any intermediate computer intercepting client requested web content,
(c) and, any source host computer of the client requested web content;

wherein the examiner host is an independently operating host as a master server, rather than a subordinate slave server such as a database server;

wherein the examiner host controls its processes and resources independently, rather than under direct external command;

wherein said identity check relies on said identification in preference over obtaining said web content itself to said identity check;

wherein in response to said client made service request, the examiner host reserves to the client a temporary service-specific:
(a) service access,
(b) service communication bridge,
(c) and, service process;

on the basis of said identity check, the examiner host determining whether the entity to which said identification belongs is:
(a) a security threat or not,
(b) or, non-wanted or not;

the examiner host providing feedback to the client on the basis of said identity check;

wherein said web-address is a URL-address or other type of address.

20. A network based web access control method according to claim 19, comprising:

preventing client access to the web content under said web-address if the examiner host determines said entity to be a security threat or non-wanted.

21. A network based web access control method according to claim 19, comprising:

an intermediate computer creating and delivering said identification on behalf of the client, and receiving feedback from the examiner host on behalf of the client;

wherein the intermediate computer is any computer in the network capable to intercept data which the client receives from the network.

22. A network based web access control method according to claim 21, comprising:

the intermediate computer:
(a) informing the client,
(b) and/or, preventing client access to the web content under said web-address, if the examiner host determines said entity to be a security threat or non-wanted.

23. An independent host computer which examines identifications of web content, for wide area networks, like the Internet, comprising:

an examiner host which is a remote third-party host computer in the wide area network;

wherein the examiner host examines on demand in real-time tiny-sized independent identifications of web content outside of the local network spheres of the dissemination source, dissemination route and dissemination target of the web content;

wherein a said identification is provided and delivered to the examiner host without the pertinent web content by a client which is either in the dissemination source, dissemination route or dissemination target of said web content;

wherein the examination of said identification is performed in response to the client service request;

wherein said identification is a data object which is based on certain property(ies) of said web content so that a unique representation of the identity of said web content is established in smaller size;

wherein said examination relies on said identification in preference over obtaining said web content itself to said examination;

wherein the examiner host is an independently operating host as a master server, rather than a subordinate slave server such as a database server;

wherein the examiner host controls its processes and resources independently, rather than under direct external command;

wherein in response to said client made service request, the examiner host reserves to the client a temporary service-specific:
(a) service access,
(b) service communication bridge,
(c) and, service process;

wherein on the basis of said examination, the examiner host determines whether the web content to which said identification belongs is:
(a) a security threat or not,
(b) or, non-wanted or not;

wherein the examiner host returns feedback to the client on the basis of said examination;

wherein the web content comprises file(s), web page(s), e-mail message(s), e-mail message attachment(s) or any data which can be acquired from the network.

* * * * *